United States Patent
Humbert et al.

(10) Patent No.: US 6,196,028 B1
(45) Date of Patent: *Mar. 6, 2001

(54) APPARATUS FOR CONTROLLING THE SAG OF A PREFORM IN AN INSTALLATION

(75) Inventors: Patrick Humbert, Paris; Pierre Ripoche, Pithiviers; Joël Landi, Paris; Jacques Goudeau, Savigny sur Orge, all of (FR)

(73) Assignee: Alcatel Fibres Optiques, Bezons Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/555,178

(22) Filed: Nov. 8, 1995

(30) Foreign Application Priority Data

Nov. 8, 1994 (FR) .................................................. 94 13378

(51) Int. Cl.⁷ .................................................. C03B 37/07
(52) U.S. Cl. .................................................. 65/483; 65/531; 65/484; 65/529
(58) Field of Search .................................................. 65/484, 531, 483, 65/279, 421, 391, 529

(56) References Cited

U.S. PATENT DOCUMENTS

| | | | |
|---|---|---|---|
| 1,948,560 | * 2/1934 | Borneman | 65/279 |
| 2,367,495 | * 1/1945 | Gray | 65/279 |
| 3,806,224 | * 4/1974 | Mac Chesney | 65/421 |
| 4,402,720 | * 9/1983 | Edahiro | 65/391 |
| 4,570,689 | * 2/1986 | Kazwa | 152/209 R |
| 5,211,732 | * 5/1993 | Abbott | 65/421 |

FOREIGN PATENT DOCUMENTS

| | | |
|---|---|---|
| B1 2223677 | 8/1978 | (AU) . |
| 0266763 A2 | 5/1988 | (EP) . |
| 4349135 | * 12/1992 | (JP) ........... 65/484 |
| WO 84/00029 | 1/1984 | (WO) . |

* cited by examiner

Primary Examiner—John Hoffmann
(74) Attorney, Agent, or Firm—Sughrue, Mion, Zinn, Macpeak & Seas, PLLC

(57) ABSTRACT

The invention relates to apparatus for supporting a preform manufactured in an installation for manufacturing or building up preforms having supporting cores, said installation including at least rotation means having a horizontal axis of rotation and two mounting points between which the supporting core of the preform to be manufactured or built up is mounted, plasma-torch and material-supply means disposed radially relative to said supporting core and being mounted to move in axial translation relative to and parallel to the supporting core so as to make said preform around said supporting core, said apparatus being wherein it includes controlled support means constituting additional localized abutment points between said mounting points for said preform being manufactured or built up.

1 Claim, 3 Drawing Sheets

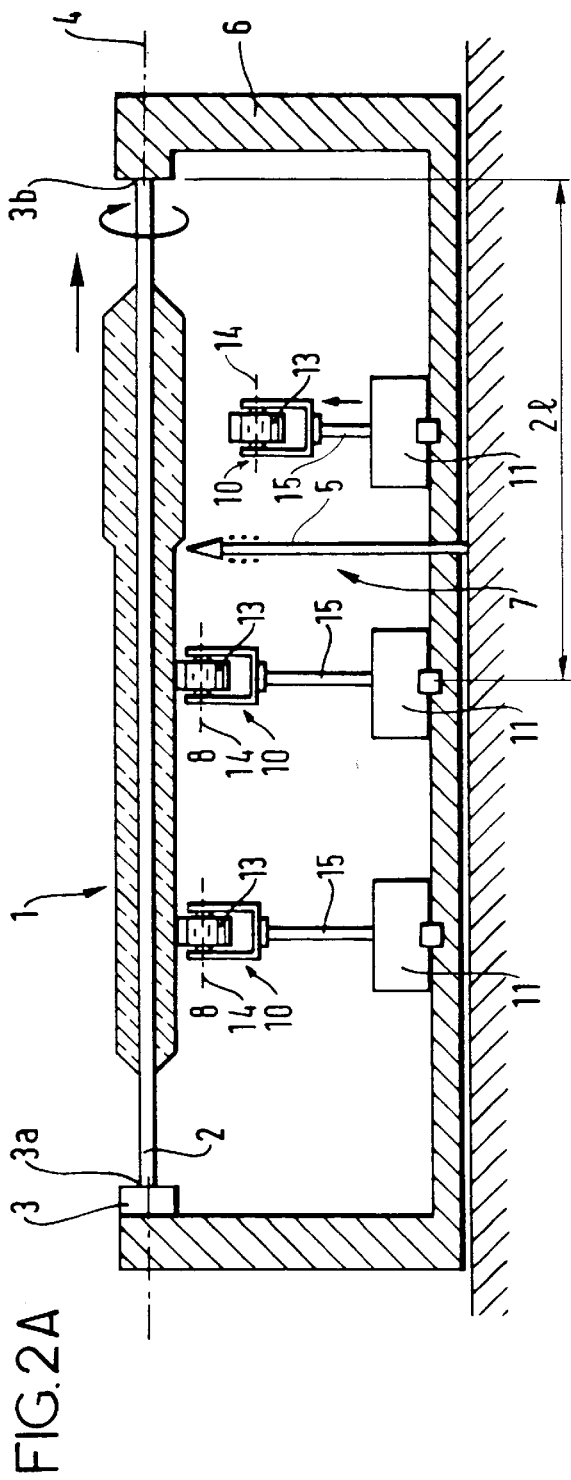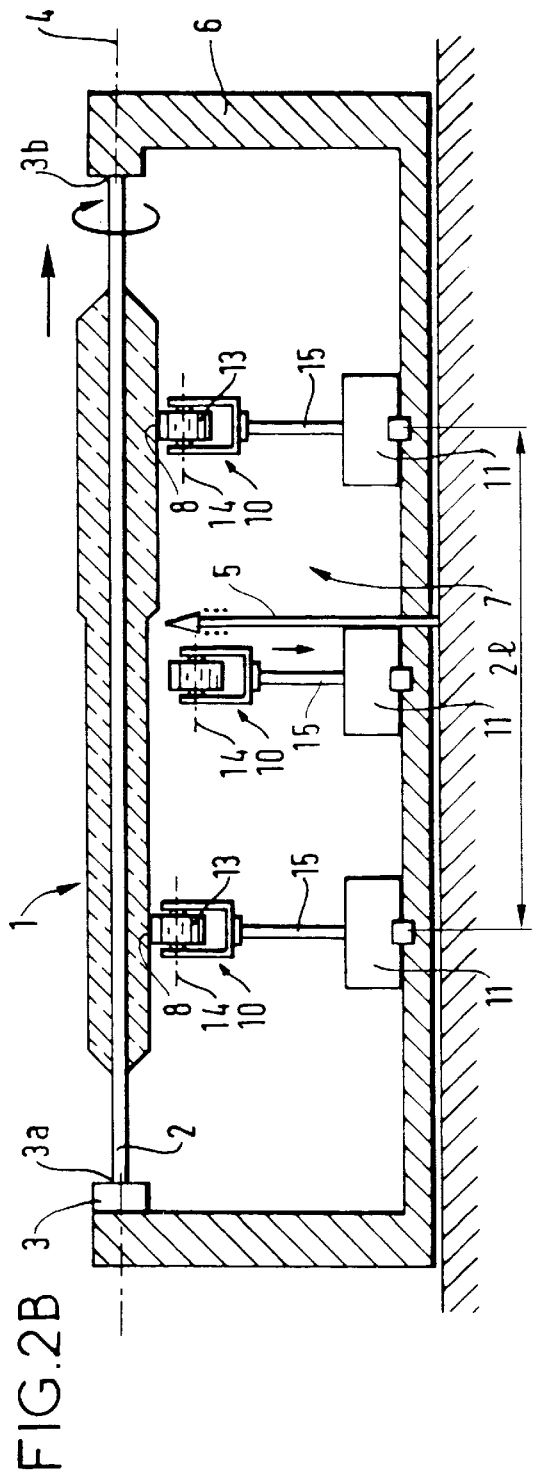

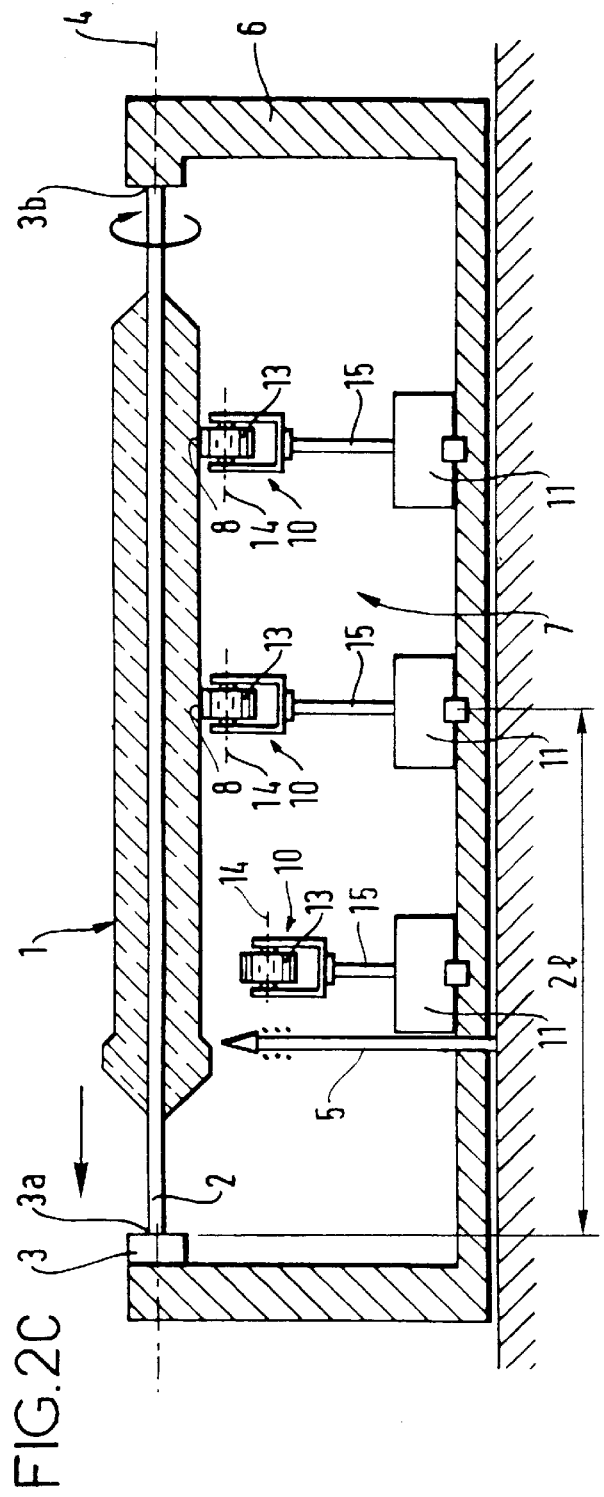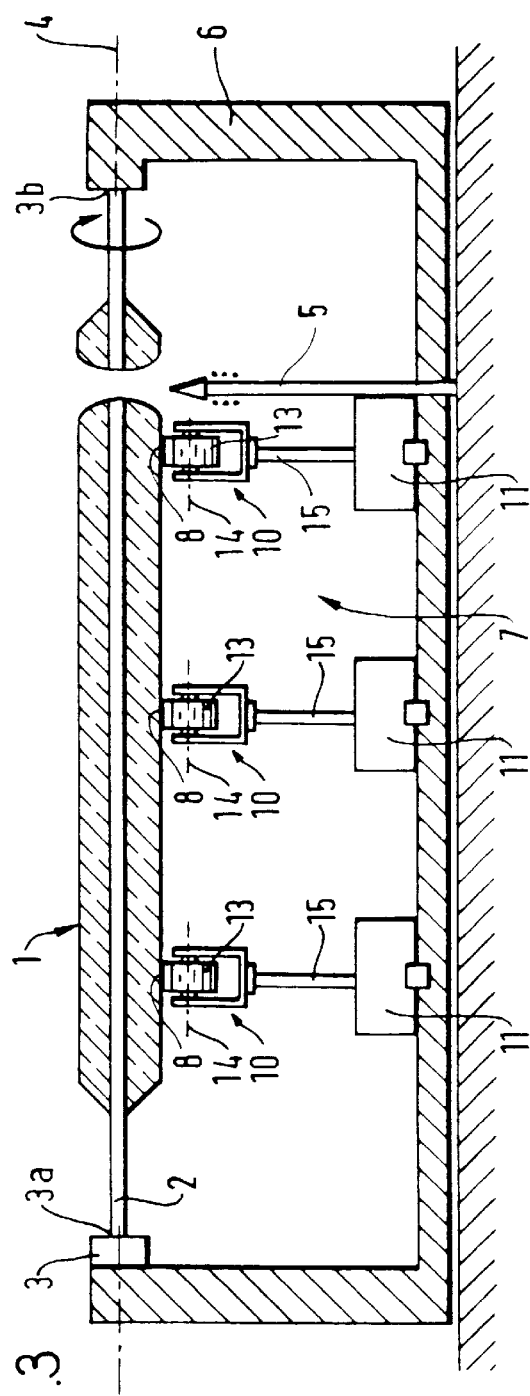

APPARATUS FOR CONTROLLING THE SAG OF A PREFORM IN AN INSTALLATION

The invention relates to apparatus for supporting a preform, an installation for manufacturing or building up an optical fiber preform and provided with such apparatus, methods implemented in such an installation, and preforms manufactured or built up using such methods.

BACKGROUND OF THE INVENTION

The invention relates more particularly to apparatus for supporting a preform manufactured or built up in an installation for manufacturing or building up preforms having central cores. This type of installation conventionally includes at least translation means and rotation means having a horizontal axis of rotation and on which the supporting core of the preform to be manufactured or built up is mounted, and plasma-torch and material-supply means disposed radially relative to said supporting core so as to make or build up said preform by coating.

The rotation means rotate the supporting core, and the plasma-torch and material-supply means are moved in axial translation parallel to the supporting core so as to deposit the layers making up the preform being manufactured on the supporting core using known principles and/or methods. In a variant, the preform is moved in translation while the torch remains stationary.

Such means are also implemented for "building up" an existing preform so as to thicken it.

After manufacturing or building up the preform, a cooling stage is currently necessary prior to the preform cutting stage during which the preform is cut manually. During the cutting stage, an operator inserts a support under the preform and cuts the preform by means of a blow-torch or the like. The cooling stage is a safety requirement made necessary by the presence of the operator.

Such a method gives rise to a significant loss of time due to preform cooling. Any shortening of the cooling stage considerably increases operator accident risks. However, locally re-heating a cooled preform, during the cutting stage, can have considerable adverse effects on the uniformity and the optical qualities of the preform in the re-heated zone. In particular, cracks may occur. It is therefore necessary to strike a compromise between quality and safety as a result of the human presence during the cutting stage.

Furthermore, the size of a preform is currently limited in particular by its weight. The preform sags under its own weight. Such sagging runs the risk of breaking an end-piece. Moreover, such sagging can have adverse effects on the uniformity of the preform.

OBJECTS AND SUMMARY OF THE INVENTION

An object of the present invention is to provide apparatus for supporting the preform, whereby it is possible to reduce both the risks of breaking an end-piece and also the mechanical stresses due to the mass of the preform, and therefore to increase the diameter and/or the length of the preform.

Another object of the present invention is to provide apparatus for and a method of automatically or semi-automatically supporting the preform, whereby the presence of an operator is no longer necessary so as to reduce significantly the duration of the separation stage, and so as to avoid quality defects caused by re-heating the preform.

To these ends, the invention provides apparatus for supporting a preform manufactured in an installation for manufacturing or building up preforms having central cores. The installation includes at least rotation means having a horizontal axis of rotation and two mounting points between which the supporting core of the preform to be manufactured or built up is mounted, plasma-torch and material-supply means disposed radially relative to said supporting core and being mounted to move in axial translation relative to and parallel to the supporting core so as to make the preform around the supporting core. The apparatus of the invention includes controlled support means constituting additional localized abutment points between said mounting points for said preform being manufactured or built up.

Advantageously, the controlled support means comprise: means for detecting the sag of the preform; at least one support element mounted on controlled positioning means mounted to move between an active end position in which said support element is in contact with said preform being manufactured, and an inactive end position in which the support element is not in contact with said preform being manufactured; and servo-control means for servo-controlling the controlled positioning means in the active end position to a predetermined reference value for the sag of the preform.

The support element includes at least one free wheel whose axis is parallel to the supporting core, which wheel is mounted to rotate freely on the controlled positioning means, and has a tread strip which comes into tangential contact with the preform being manufactured, in the active end position.

The controlled support means are prevented from moving in axial translation relative to the preform.

According to another characteristic of the invention, the positioning means include synchronization means for synchronizing them with the relative movement in axial translation between the preform and the plasma-torch and material-supply means, so as to go to the inactive end position when the plasma-torch and material-supply means cross paths with the positioning means.

Advantageously, the apparatus includes a plurality of support elements, each of which has associated positioning means, the elements being disposed at regular axial intervals and radially to the horizontal axis of rotation of the rotation means.

In their active end positions, the free wheels are preferably in contact with the bottom of the periphery of the preform.

The invention also provides an installation for manufacturing or building up preforms having central cores, said installation including at least rotation means which have a horizontal axis of rotation and on which the supporting core of the preform to be manufactured or built up is mounted, plasma-torch and material-supply means disposed radially relative to said supporting core and being mounted to move in axial translation relative to and parallel to the supporting core so as to manufacture or build up said preform around said supporting core. According to the invention, the installation includes support apparatus as described above.

The invention also provides a method of supporting a preform being manufactured or built up in an installation as described above, in which method:

the value of the sag stress of the preform is compared with the reference value;

the positioning means are controlled so as to reach said reference value; and the positioning means are controlled such that they are synchronized with the relative movement in axial translation between the preform and the plasma-torch and material-supply means, so that the positioning means go to the inactive end position when the plasma-torch and material-supply means cross paths with said positioning means.

The invention further provides a method of cutting a preform manufactured or built up in an installation as described above, in which method, immediately after manufacture or building-up, and with the preform still rotating:

the value of the sag stress of the core is compared with the reference value;

the positioning means are controlled so as to reach said reference value;

the plasma torch is positioned facing the chosen cutting section; and the plasma torch is actuated so as to cut the preform.

A first advantage of the present invention is that the mass of the preform is no longer a limiting factor. In particular, this makes it possible to increase the diameter or the length of preforms without any risk of an end-piece breaking or of the preform being deformed significantly under its own weight.

Another advantage of the present invention is that it is possible to make the preform-cutting stage automatic, thereby considerably reducing the time necessary for removing and storing a manufactured or built-up preform, eliminating the human risk factor, and improving the quality of the resulting preforms.

BRIEF DESCRIPTION OF THE DRAWINGS

Other advantages and characteristics of the present invention appear from the following description given with reference to the accompanying drawings, in which:

FIGS. 2A, 2B, and 2C diagrammatically and sequentially show how the apparatus of the invention is synchronized; and FIG. 3 is a diagrammatic view of the cutting stage of the invention.

MORE DETAILED DESCRIPTION

Figure 1:
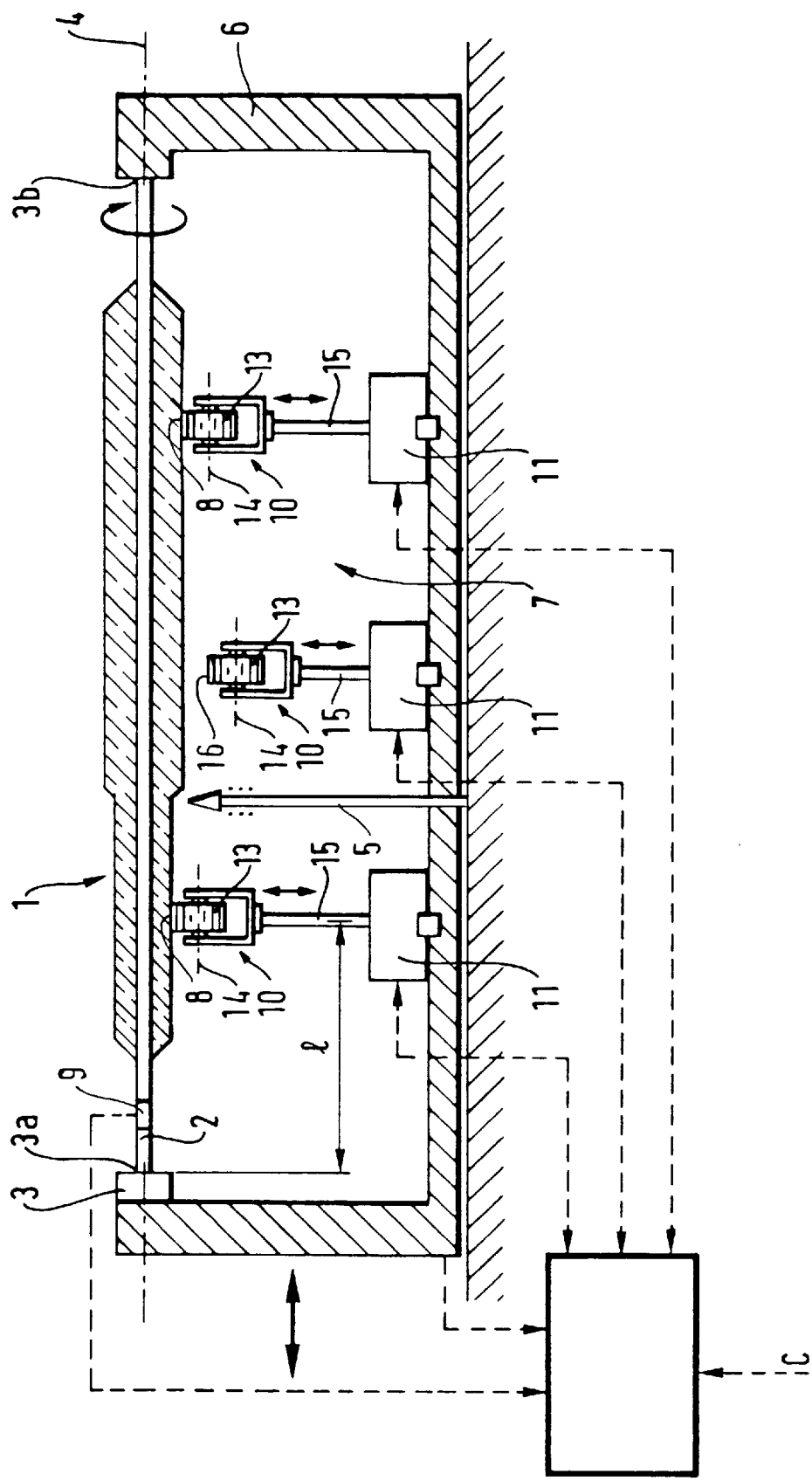
FIG. 1 is a diagrammatic view of the installation of the invention.

The apparatus of the invention is designed to be mounted on a prior art installation for manufacturing or building up a preform 1 having a central supporting core 2. In known manner, the installation comprises at least rotation means 3 having a horizontal axis of rotation 4 and on which the supporting core 2 of the preform 1 to be manufactured or built up is mounted, and plasma-torch and material-supply means 5 disposed radially relative to said supporting core 2. In known manner, the installation makes it possible for the plasma-torch and material-supply means 5 to move in axial translation relative to and parallel to the supporting core 2 so as to make the preform 1 around the supporting core 2.

In the embodiment shown in the figures, the rotation means 3 are mounted on a moving frame 6 that moves in translation parallel to the axis of rotation 4, the plasma-torch and material supply means 5 being stationary.

The preform being manufactured or built up is therefore moved in translation simultaneously with the frame to which it is fastened at two abutment points constituted by the mounting points 3a and 3b at which the supporting core 2 is mounted on the rotation means 3.

According to the present invention, the support apparatus includes controlled support means 7 disposed between the mounting points 3a and 3b, and constituting additional abutment points 8 for the preform 1. Thus, by appropriately choosing the locations of the controlled support means 7, it is possible to reduce the sag due to the mass of the preform being manufactured or being built up.

The controlled support means 7 comprise: means 9 for measuring the sag of the preform 1; at least one support element 10 mounted on controlled positioning means 11 mounted to move between an active end position in which the support element 10 is in contact 8 with the preform 1 being manufactured, and an inactive end position in which the support element 10 is not in contact with the preform 1 being manufactured; and servo-control means 12 for servo-controlling the controlled positioning means 11 in the active end position to a controllable predetermined reference value C for the sag of the preform 1.

The means 9 for measuring the sag of the preform may be strain gauges 9 disposed on the supporting core 2 and associated with a computer 12 which, on the basis of the observed strain, calculates the sag of the preform and controls the positioning means 11 accordingly. The means 9 for measuring the sag may be constituted by any other known displacement-measurement means connected to a computer 12 for controlling the positioning means.

The support element 10 shown in the figures includes at least one free wheel 13 whose axis 14 is parallel to the axis of rotation 4, the wheel being supported by a rod 15 of the positioning means 11, which rod is movably mounted to move radially between the end positions. Advantageously, the wheel is made of a material that resists high temperatures, such as in particular graphite. However, the material must not constitute a source of pollution for the preform being manufactured.

In the active end position, the tread strip 16 of the wheel 13 is in tangential contact with the periphery of the preform 1, it is rotated by the preform 1, and it constitutes an unavoidable abutment point 8 for the preform 1 so as to attenuate or eliminate the sag of the preform 1.

In the inactive end position, the wheel 13 is no longer in contact with the preform.

In the embodiment shown in the figures, the support apparatus comprises three support elements 10 with their associated positioning means 11, prevented from moving in axial translation relative to the frame 6, and subdividing into four regular intervals l the distance between the mounting points 3a and 3b. The positioning means 11 are connected to the computer 12 which controls them.

The apparatus of the invention further includes synchronization means for synchronizing the positioning means 11 with the relative movement in axial translation between the preform 1 and the plasma-torch and material-supply means 5. The purpose of the synchronization means is to cause each support element 10 to go into its inactive end position whenever it crosses paths with the plasma-torch and material-supply means 5. The synchronization means may be software, electromechanical or optical means, and they are constituted by switches appropriately located before and after each support element 10, so that when the switch before the support element goes past the plasma-torch and material-supply means 5 it de-activates the corresponding positioning means 11, and when the switch after the support element goes past the plasma-torch and material-supply means 5 it re-activates the corresponding positioning means. In the embodiment shown in the figures, the support elements 10 advantageously come into contact with the bottom of the periphery of the preform 1.

In this way, in the embodiment shown in the figures, the maximum distance between two abutment points for the preform 1 being manufactured or being built up is equal to 2l for a total preform length equal to 4l.

The positioning means may be servo-controlled continuously (very short sampling period), or else they may be servo-controlled at predetermined given times during the process of manufacturing or building up the preform.

The method of supporting a preform being manufactured or being built up in an installation provided with apparatus as described above comprises the following steps:

during preform manufacture or building-up:

the value of the sag of the core is compared with the reference value;

the positioning means are controlled so as to reach said reference value; and the positioning means are controlled such that they are synchronized with the relative movement in axial translation between the preform and the plasma-torch and material-supply means, so that the positioning means go to the inactive end position when the plasma-torch and material-supply means cross paths with said positioning means.

FIGS. 2A, 2B, and 2C show a synchronization sequence of the apparatus.

In FIG. 2A, the frame 6 is moving towards the right of the figure, the right support element 10 is in the process of going from its inactive position to its active position. The right support element 10 comes into contact with the preform 1 after a predetermined time delay calculated so that the contact surface of the preform 1 has cooled sufficiently to ensure that the support element 10 does not leave a deep groove in the preform 1.

In FIG. 2B the central support element 10 is in the process of going from its active position to its inactive position. This occurs when both the right support element 10 and the left support element 10 are in their active positions, and the central element 10 is in the vicinity of the plasma-torch and material-supply means 5.

In FIG. 2C the frame 6 is moving leftwards, the left support element 10 having been in its inactive position since it crossed paths with the plasma-torch and material-supply means 5 while the frame 6 was moving rightwards, and it will return to its active position only after it has re-crossed paths with plasma-torch and material-supply means 5 in the other direction and after the cooling time-delay.

Furthermore, an installation as described above and including support apparatus makes it possible to implement a method of cutting the manufactured or built-up preform. In this method, immediately after manufacture or building-up, and with the preform still rotating:

the value of the sag of the core is compared with the reference value;

the positioning means are controlled so as to reach said reference value;

the plasma torch is positioned facing the chosen cutting section; and the plasma torch is actuated so as to cut the preform.

FIG. 3 shows the situation during a cutting stage.

The support apparatus of the invention makes it possible to overcome problems related to the weight of the preform, thereby enabling preforms to be made that are of greater length or diameter. Currently, a preform made on prior art installations cannot exceed a mass of 7.5 kg for a length of about 1 m and a diameter of about 70 mm. An installation provided with support apparatus makes it possible to multiply the mass of the preform by at least three, e.g. so to make a preform that is 1.3 m long and that has a diameter of 100 mm.

Another advantage of the present invention is that it enables the preform to be cut immediately after it has been manufactured or built up. This makes automatic cutting possible, thereby increasing productivity, removing risks to the operator, and removing risks of quality defects occurring in the preform due to re-heating the preform as in the prior art.

Although only one embodiment is described, any obvious modification made to the invention by a person skilled in the art remains within the ambit of said invention.

In particular, any sensing system making it possible to measure either the sag of the preform or else an equivalent characteristic, and any computer system making it possible to control the positioning means on the basis of information from the sensing system lie within the ambit of the invention.

The number and the locations of the support elements may be arbitrary without going beyond the ambit of the invention. For example, each support element may be constituted by a plurality of wheels having a common axis, or by a plurality of wheels having parallel axes and disposed in a common plane.

What is claimed is:

1. An apparatus for supporting a preform manufactured in an installation, said preform having a supporting core, said installation including (1) rotation means having a horizontal axis of rotation, (2) two mounting points between which said supporting core is mounted, and (3) a plasma-torch and material-supply means disposed radially relative to said supporting core and mounted to move in axial translation relative to said supporting core, said apparatus comprising:

controlled support means including (1) a sensor that measures a preform characteristic indicative of a sag of said preform;

(2) controlled positioning means supporting at least one support element for movement between a variable active end position in which said at least one support element is in contact with said preform, and an inactive end position in which said at least one support element is spaced apart from said preform;

(3) servo-control means for servo-controlling positioning of said controlled positioning means in the variable active end position depending on said preform characteristic measured by said sensor; and (4) synchronization means for synchronizing said controlled positioning means in accordance with relative movement in axial translation between said preform and said plasma-torch and material-supply means, to cause said support element to assume said inactive end position when said plasma-torch and material-supply means cross paths with said positioning means.

* * * * *